(12) United States Patent
Kim

(10) Patent No.: US 8,434,089 B2
(45) Date of Patent: Apr. 30, 2013

(54) METHOD AND SYSTEM FOR LOADING OF IMAGE RESOURCE

(75) Inventor: Dae Il Kim, Jeollanam-do (KR)

(73) Assignee: NHN Corporation, Seongnam-si (KR)

( * ) Notice: Subject to any disclaimer, the term of this patent is extended or adjusted under 35 U.S.C. 154(b) by 609 days.

(21) Appl. No.: 11/570,612

(22) PCT Filed: Jun. 22, 2005

(86) PCT No.: PCT/KR2005/001929
§ 371 (c)(1),
(2), (4) Date: Dec. 14, 2006

(87) PCT Pub. No.: WO2006/001630
PCT Pub. Date: Jan. 5, 2006

(65) Prior Publication Data
US 2008/0211822 A1      Sep. 4, 2008

(30) Foreign Application Priority Data

Jun. 23, 2004  (KR) .................. 10-2004-0047069

(51) Int. Cl.
*G06F 9/46* (2006.01)
(52) U.S. Cl.
USPC .......................................... 718/105; 345/501
(58) Field of Classification Search .................. None
See application file for complete search history.

(56) References Cited

U.S. PATENT DOCUMENTS

| | | | | |
|---|---|---|---|---|
| 5,815,168 A | * | 9/1998 | May | 345/572 |
| 5,917,505 A | * | 6/1999 | Larson | 345/522 |
| 6,002,933 A | * | 12/1999 | Bender et al. | 455/442 |
| 6,128,642 A | * | 10/2000 | Doraswamy et al. | 709/201 |
| 6,289,369 B1 | * | 9/2001 | Sundaresan | 718/103 |
| 6,609,190 B1 | * | 8/2003 | Kahle et al. | 712/214 |
| 6,629,220 B1 | * | 9/2003 | Dyer | 711/158 |

(Continued)

FOREIGN PATENT DOCUMENTS

| | | |
|---|---|---|
| JP | 09-297854 | 11/1997 |
| JP | 10-105154 | 4/1998 |

(Continued)

*Primary Examiner* — James Thompson
*Assistant Examiner* — David H Chu
(74) *Attorney, Agent, or Firm* — H.C. Park & Associates, PLC

(57) ABSTRACT

Disclosed are image resource loading method comprising the steps of: identifying source data associated with a particular cell from a predetermined basic recording space, in case that a rendering event for the cell occurs; sequentially moving (5) unit source data constituting the identified source data to a first loading queue by a predetermined period; determining loading fitness with respect to the unit source data positioned at the first loading queue in accordance with a predetermined determination standard, in which the loading fitness is divided into a pass or non-pass; moving the unit source data to a second loading queue in case that it is determined that the loading (10) fitness is non-pass; loading the unit source data positioned at the first loading queue to a predetermined graphic memory at the processor unit, in case that it is determined that the loading fitness is a pass; and rendering the unit source data loaded to the graphic memory at a predetermined video processor unit; wherein, in the step of determining the loading fitness, the loading fitness is determined by considering the loading capacity of (15) the processor unit or the rendering capacity of the video processor unit, and a system thereof.

17 Claims, 8 Drawing Sheets

U.S. PATENT DOCUMENTS

| | | | |
|---|---|---|---|
| 6,651,082 B1 * | 11/2003 | Kawase et al. | 718/105 |
| 6,918,117 B2 * | 7/2005 | Mayfield | 718/105 |
| 6,956,579 B1 * | 10/2005 | Diard et al. | 345/537 |
| 7,080,379 B2 * | 7/2006 | Brenner et al. | 718/105 |
| 7,317,730 B1 * | 1/2008 | Devanagondi et al. | 370/412 |
| 7,369,133 B1 * | 5/2008 | Van Dyke et al. | 345/542 |
| 7,395,538 B1 * | 7/2008 | Carney et al. | 718/105 |
| 2002/0194354 A1 | 12/2002 | Bolduc | |
| 2003/0225737 A1 * | 12/2003 | Mathews | 707/1 |
| 2004/0163084 A1 * | 8/2004 | Devadas et al. | 718/103 |
| 2004/0208178 A1 * | 10/2004 | Tuck et al. | 370/392 |
| 2005/0210472 A1 * | 9/2005 | Accapadi et al. | 718/105 |
| 2006/0022985 A1 * | 2/2006 | Shepherd et al. | 345/535 |
| 2007/0033279 A1 * | 2/2007 | Battat et al. | 709/224 |
| 2007/0070077 A1 * | 3/2007 | Hsu | 345/582 |
| 2008/0255705 A1 * | 10/2008 | Degeal et al. | 700/273 |

FOREIGN PATENT DOCUMENTS

| | | |
|---|---|---|
| JP | 10-275247 | 10/1998 |
| JP | 11-250232 | 9/1999 |
| JP | 2001-297000 | 10/2001 |
| KR | 2004-0035585 | 4/2004 |
| KR | 2001-0092408 | 10/2004 |
| KR | 2005-0061249 | 6/2005 |

* cited by examiner

METHOD AND SYSTEM FOR LOADING OF IMAGE RESOURCE

CROSS REFERENCE TO RELATED APPLICATIONS

This application is a U.S. National Phase Application of International Application PCT Application No. PCT/KR2005/001929 filed on Jun. 22, 2005, which claims the benefit of priority from Korean Patent Application No. 10-2004-0047069 filed on Jun. 23, 2004. The disclosures of International Application PCT Application No. PCT/KR2005/001929 and Korean Patent Application No. 10-2004-0047069 are incorporated herein by reference.

TECHNICAL FIELD

The present invention relates to image resource loading method and system, and more particularly, to image resource loading method and system in which loading availability with respect to source data is determined by considering the capacity of a loading device and the capacity of a rendering device, and whether to load source data for a corresponding period is determined on the basis of a determination result.

BACKGROUND ART

In an image rendering processing method according to the prior art, the mainstream has been a method enabling loading and rendering to be performed in time series in which a CPU (Central Processing Unit) and a GPU (Graphics Processing Unit) are composed of an identical rendering thread, and the CPU is involved in loading of image data to be rendered and the GPU renders the loaded image data, thereby realizing an image. Since the resource loading method as above is weak in a lag phenomenon that the GPU stops rendering while the CPU loading a resource, there is a disadvantage that the rendering efficiency of the GPU gets lowered extremely. That is, the lag phenomenon becomes an element irregularly stopping image realization en route, which causes a disconnected image or irregularly realized image to be provided to a user.

Particularly, in case of a conventional resource loading and rendering method, since an amount of image resources to be loaded at the MMORPG (Massively Multi-player Online Role Playing Game) service becomes huge and a loading time increases in proportion, the occurrence of lag becomes more frequent. Further, since the trend of the future graphics is moving onto a 3 D game and, in case of the 3 D game, an amount of computation for rendering sharply increases in comparison to a 2 D game, it is essential the appearance of a new loading and rendering method, capable of noticeably controlling the lag phenomenon, in order to support the 3 D game.

Also, in the conventional resource loading method, in case that an amount of resources to be loaded becomes enormous, it affects the rendering thread between the CPU and the GPU, and may act as an element preventing smooth driving of the CPU and the GPU. Particularly, in the conventional resource loading method, such as, a case of loading a resource associated with rendering of an image composed of a plurality of polygon data or a character, since all resources should be loaded, a rendering time may be prolonged unlimitedly.

DISCLOSURE OF INVENTION

Technical Goals

The present invention is conceived to solve the problems as described above. Thus, the present invention provides image resource loading method and system, which enable a loading process loading an image resource and a rendering process rendering the loaded image resource to be performed in parallel by a separate thread.

The present invention also provides image resource loading method and system, which can flexibly adjust a loading time point of unit source data by determining the loading availability with respect to particular unit source data in accordance with the capacity of a processor unit, a CPU, or a video processor unit, a GPU.

The present invention also provides image resource loading method and system, which guarantee the optimization of image realization with respect to unit source data to be rendered by precisely determining a time point when a loading process with respect to unit source data is improper on the basis of determination of loading fitness, and cut off the loading process in a corresponding period.

The present invention also provides image resource loading method and system, which guarantee the consecution of image realization with respect to a rendering target by enabling a loading process with respect to unit source data of which loading process is cut off in a previous period to be preferentially performed in the next period, while flexibly adjusting and changing a loading time point of unit source data.

Technical Solutions

In order to achieve the above goals, according to an aspect of the present invention, there is provided an image resource loading method including the steps of: identifying source data associated with a particular cell from a predetermined basic recording space, in case that a rendering event for the cell occurs; sequentially moving unit source data constituting the identified source data to a first loading queue by a predetermined period; determining loading fitness with respect to the unit source data positioned at the first loading queue in accordance with a predetermined determination standard, in which the loading fitness is divided into a pass or non-pass; moving the unit source data to a second loading queue in case that it is determined that the loading fitness is non-pass; loading the unit source data positioned at the first loading queue to a predetermined graphic memory at the processor unit, in case that it is determined that the loading fitness is a pass; and rendering the unit source data loaded to the graphic memory at a predetermined video processor unit; wherein, in the step of determining the loading fitness, the loading fitness is determined by considering the loading capacity of the processor unit or the rendering capacity of the video processor unit.

Also, according to another aspect of the present invention, there is provided an image resource loading system including: a basic recording space for storing source data required for rendering by each cell; a source identification unit identifying a cell associated with a predetermined event in case that the event occurs, identifying source data corresponding to the cell from the basic recording space, and giving predetermined sequential information to at least one of unit source data constituting the identified source data in accordance with a predetermined standard; a loading determination unit moving the unit source data to a predetermined first loading queue on the basis of the sequential information, by a set period, and determining loading fitness of the moved unit source data to be a pass or non-pass; a processor unit loading the unit source data of which the loading fitness is determined to be a pass by the loading determination unit to a predetermined graphic memory; and a video processor unit processing the rendering by using the loaded unit source data; wherein the loading determination unit moves the unit source data of which the loading fitness is determined to be non-pass to a second loading queue.

BEST MODE FOR CARRYING OUT THE INVENTION

Hereinafter, image resource loading method and system will be described with reference to the accompanying drawings.

Source data continuously used in the present specification indicates data used in a rendering process to realize a particular image, and for example, may be object data associated with rendering of a static thing such as a building or a tree, or, model data associated with rendering of a moving character such as a player character or a NPC. The source data may be composed of at least one of unit source data divided into a predetermined size by considering the capability of a rendering unit involved in a rendering process (a video processor unit in the present invention). The size of unit source data may be differentially divided for each type of source data or may be divided as same irrespective of the type.

Also, a cell may be an image area as a virtual unit division where rendering is performed. Particularly, in the present embodiment, the cell is a game cell indicating each division area in case that an area is divided in a RPG (Role Playing Game) in which a player character progresses a game while moving on the area. That is, the game cell may be a unit standard enabling all sorts of data (including an image having source data rendered) associated with a location of the player character in a game to be provided to a gamer. For example, a client terminal is connected to a predetermined game server for each game cell (or a plurality of grouped game cells), and a player character positioned in a corresponding game cell receives all sorts of services associated with a game progress from the game server.

Figure 1:
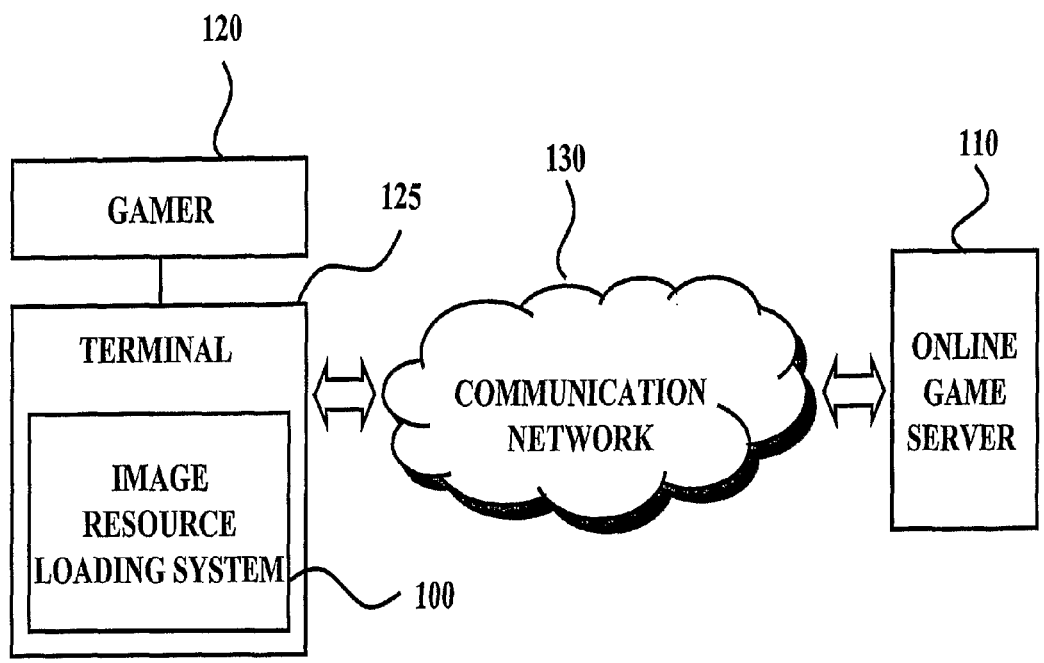
FIG. 1 is a view explaining schematic operations of an image resource loading system according to the present invention.

FIG. 1 is a view explaining schematic operations of an image resource loading system according to the present invention.

An image resource loading system 100 is a device for loading source data with respect to a particular game cell and rendering the loaded source data, but flexibly controlling the loading availability with respect to source data by considering the capability of a CPU (Central Processing Unit, a processor unit in the present embodiment) and a GPU (Graphics Processing Unit, a video processor unit in the present embodiment). As described above, the image resource loading system 100 may be embodied in a RPG demanding various and rapid rendering processes according to a location of a player character in a game, particularly, in a MMORPG (Massively Multi-player Online Role Playing Game) in which a plurality of gamers simultaneously plays a game via the online in a broad game area. Accordingly, in the present embodiment, it is described as an illustrative example that the image resource loading system 100 of the present invention is embodied in an online-based RPG. This is for convenience of description. Only, it will be apparent to those of ordinary skills in the related art that technical spirits of the present invention may be applied to all fields related with data loading for image realization on a display unit as well as an online-based game. Also, in the present embodiment, as illustrated in FIG. 1, it is described as an illustrative example that the image resource loading system 100 is embodied in a predetermined terminal 125 of a gamer 120, thereby providing a rendering image with respect to loaded source data to the gamer 120 to the optimization.

An online game server 110 may be a MMORPG-related game service server that is connected to the terminal 125 of the gamer 120 and a communication network 130, and serves to provide an online game service to the gamer 120. In case that the gamer 120 accesses the online game server 110 by using the terminal 125 in which a game-related program installed, a game service in the online game server 110 may be provided through the game-related program run by game progress data or game patch transmitted to the terminal 125 from the online game server 110. Also, the online game server 110 grants a right to control of operations with respect to a predetermined player character to the gamer 120 in this game environment, and enables the gamer 120 to control the operations of the player character independently, thereby providing a full game service.

The gamer 120 may be an Internet user who has the terminal 125 to access the communication network 130, and receives a game service from the online game server 110 with which the gamer 120 is making a predetermined contract. The gamer 120 may control a player character to move to a particular game cell on a broad game area. Also, the gamer 120 receives an image corresponding to a corresponding game cell through rendering by the image resource loading system 100 of the present invention.

The terminal 125 is a device that maintains a connection sate with the online game server 110 via the communication network 130 such as the Internet and a telephone line, and embodies an online game. That is, the terminal 125 is a general concept of terminals having computation capacity by mounting a predetermined memory unit and a micro processor, for example, a personal computer, a handheld computer, a PDA (Personal Digital Assistant), a cell phone, a smart phone, and the like.

The image resource loading system 100 serves to divide mass source data into at least one of unit source data and to repeat loading and rendering with respect to the divided unit source data. The image resource loading system 100 controls loading of unit source data to be completed only in case that loading fitness satisfies a pass in a predetermined period. Hereinafter, concrete configuration of an image resource loading system 200 of the present invention will be described with reference to FIG. 2.

Figure 2:
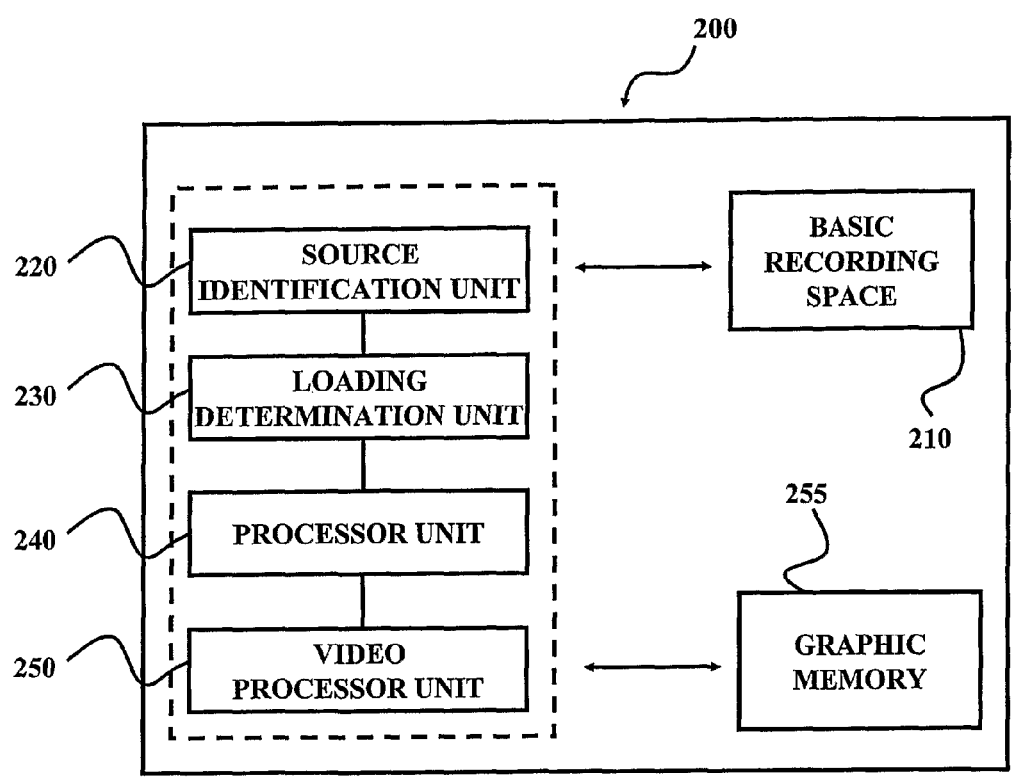
FIG. 2 is a configuration diagram illustrating an image resource loading system according to a preferred embodiment of the present invention.

FIG. 2 is a configuration diagram illustrating an image resource loading system according to a preferred embodiment of the present invention.

The image resource loading system 200 of the present invention includes a basic recording space 210, a source identification unit 220, a loading determination unit 230, a processor unit 240, and a video processor unit 250.

The basic recording space 210 is a logical or physical recording device for storing source data necessary for rendering process by the unit of a cell. The basic recording space 210 synthetically stores and maintains image information associated with rendering with respect to a certain game area where a game progress is performed. Particularly, the basic recording space 210 classifies source data to correspond to each cell (game cell) and stores, or stores source data such that source data corresponding to each cell may be classified. Accordingly, in case that a rendering event for a particular game cell occurs, the basic recording space 210 may precisely identify a game cell requiring rendering and rapidly recognize source data corresponding to the identified game cell.

The source identification unit 220 is a unit identifying source data corresponding to a cell associated with a predetermined event from the basic recording space 210, in case that the event occurs. That is, the source identification unit 220 serves to recognize source data associated with a game cell where a player character is positioned, or a game cell where the player character is estimated to be positioned at a future time point, in case that a rendering event occurs, from the basic recording space 210. Particularly, the source identification unit 220 divides source data into a predetermined unit size enabling the identified source data to be loaded to the optimization, thereby generating at least one of unit source data. The source identification unit 220 may divide the unit source data such that its size is differentiated for each type of independently loaded source data, for example, object data, or model data. Or, the source identification unit 220 may equally divide the identified source data to have a certain size, irrespective of the type of source data. According to another embodiment of the present invention, the size of unit source data divided by the source identification unit 220 also may be automatically determined by considering the system specification of a client terminal.

Also, the source identification unit 220 gives predetermined sequential information to at least one of unit source data constituting the identified source data in accordance with a predetermined standard. At this time, the sequential information is associated with determination of an order in which loading is performed in rendering with respect to a particular game cell, and unit source data of which sequential information is comparatively high is preferentially loaded. Also, a predetermined standard of giving sequential information may be flexibly set by an operator of the present system. For example, sequential information may be given in order of object data positioned in the nearer distance from a player character, or in order of object data positioned in an eye direction of the player character.

The loading determination unit 230 is a unit moving unit source data to a predetermined first loading queue on the basis of the sequential information, by a set period, and determining the loading fitness of the unit source data moved to the first loading queue to be a pass or non-pass. At this time, the first loading queue may be a logical or physical buffer unit at which unit source data to be loaded in this period by the processor unit 240 is positioned. That is, movement of unit source data to the first loading queue is performed per predetermined period, and unit source data of which sequential information is comparatively most ahead may be preferentially moved to the first loading queue. Also, the loading determination unit 230 determines the loading availability with respect to unit source data positioned at the first loading queue in this period. The loading availability may be determined in accordance with determination about predetermined loading fitness. As described later, only unit source data of which loading fitness is determined to be a pass is loaded to a graphic memory 255.

In the present embodiment, it is described as an illustrative example that loading of unit source data positioned at the first loading queue is substantially performed only in case that the capability of the processor unit 240 or the video processor unit 250 is shown to be more than certain ability. That is, although unit source data enters the first loading queue, the loading determination unit 230 determines the loading fitness to be a pass only in case that it is guaranteed loading or rendering in the optimized state, and allows loading of the unit source data. On the other hand, in case of loading unit source data positioned at the first loading queue, the loading determination unit 230 determines the loading fitness to be non-pass in case that it is determined that it is impossible to perform normal loading or rendering, and cuts off loading of the unit source data.

Unit source data of which the loading fitness is determined to be non-pass moves to a predetermined second loading queue, and loading by the processor unit 240 is omitted in this period. Unit source data positioned at the second loading queue may be preferentially moved to the first loading queue in the next period, and determination with respect to the loading availability of the unit source data may be repeatedly performed. Hereinafter, a process of determining the loading availability with respect to unit source data will be further in detail described with reference to FIG. 3.

Figure 3:
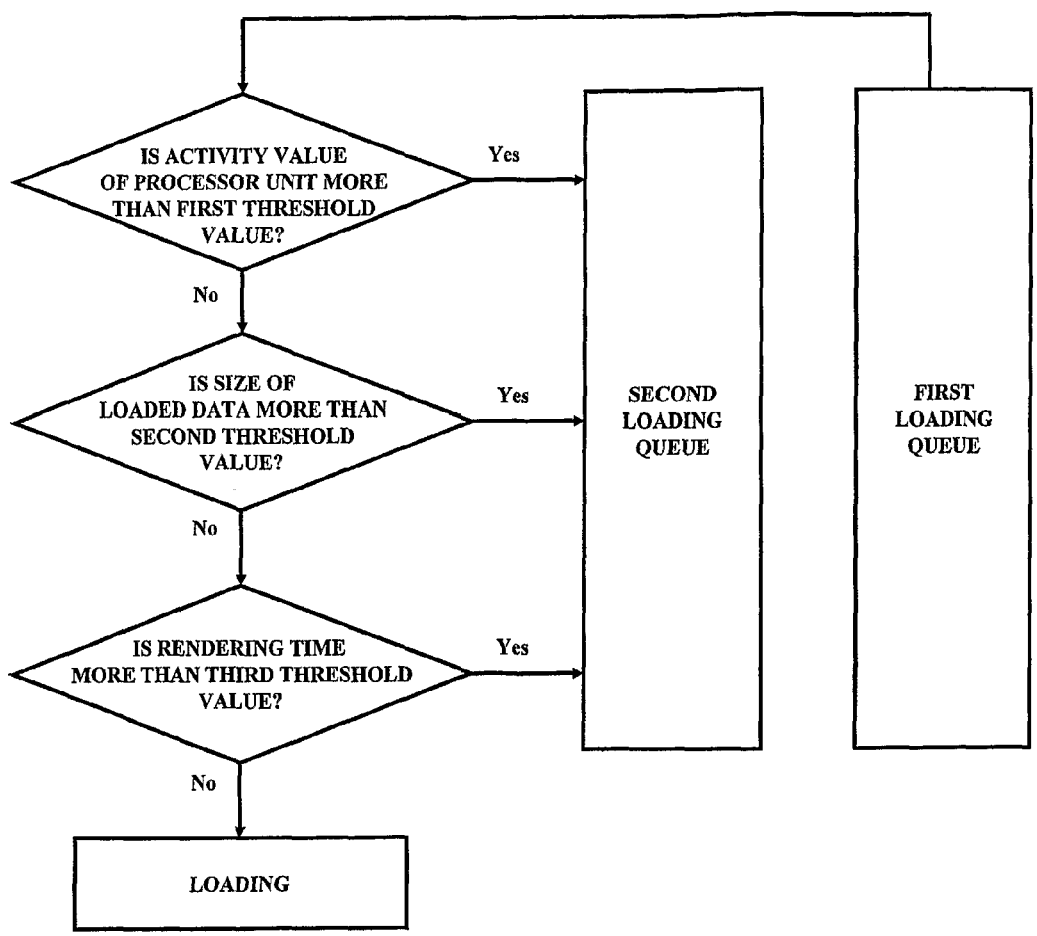
FIG. 3 is a view explaining a model of determining loading fitness through comparison between a predetermined threshold value and a numerical value computed based on a determination standard of the present invention.

FIG. 3 is a view explaining a model of determining loading fitness through comparison between a predetermined threshold value and a numerical value computed based on a determination standard of the present invention.

As illustrated in FIG. 3, an activity amount of the processor unit 240, the size of data loaded to the graphic memory 255, and a rendering time of the video processor unit 250 may be considered as determination standards with respect to the loading availability. In case that any one of values measured based on the determination standards is more than a set-up threshold value, the loading determination unit 230 determines the loading fitness with respect to unit source data positioned at the first loading queue to be non-pass.

An activity amount of the processor unit 240 has relation with that the processor unit 240 completes loading of unit source data positioned at the first loading queue within a predetermined period. In case that an activity amount of the processor unit 240 is more than a predetermined first threshold value, a huge backlog of loading process may occur due to overuse of the processor unit 240. That is, the loading determination unit 230 determines the loading fitness to be non-pass, in case that the unit source data positioned at the first loading queue in the previous period is not all loaded within the period by the processor unit 240. It is because an activity amount of the processor unit 240 increases rapidly as signal processing demands increase, such as input processing at an input device (e.g. a computer mouse or a keyboard), network data processing, and animation processing (e.g. motion control of a character). At this time, since the processor unit 240 has to process a lot of operations at a time, the processor unit 240 may not complete loading of unit source data before a corresponding period passes.

Accordingly, unit source data does not need to be additionally loaded until loading with respect to unit source data currently being loaded is completed. Also, it is highly possible that further loading unit source data of the next period at a state where source data is backlogged due to loading delay may add the backlog of source data. Thus, the loading determination unit 230 moves the unit source data positioned at the first loading queue to the second loading queue to wait for loading, in order not to generate additional unit source data to be loaded by the processor unit 240.

Also, the size of data accumulated in the graphic memory 255 has relation with rendering efficiency by the video processor unit 250. In case that unit source data positioned at the first loading queue is loaded, and thereby, the accumulation ratio of data accumulated in the graphic memory 255 is more than a predetermined second threshold value, this may cause overload to the video processor unit 250. That is, in case that it is determined that a marginal space is insufficient in the graphic memory 255, the loading determination unit 230 determines loading fitness to be non-pass, and omits loading process of this period with respect to unit source data positioned at the first loading queue, thereby not performing loading of additional unit source data. The accumulation ratio of data determined by the second threshold value may have relation with the data accumulation capacity of the graphic memory 255, and may be flexibly determined within the scope in which the rendering process of the video processor unit 255 may be guaranteed to the optimization.

Also, a time elapsed in rendering performed at the video processor unit 250 has relation with the attribute of unit source data to be rendered. In case that the rendering time of the vide processor unit 250 is more than a predetermined third threshold value, it can be known that a more processing time is required to complete rendering of corresponding unit source data. That is, in case of unit source data of which rendering demands a complicated and sophisticated computation, the loading determination unit 230 determines the loading fitness with respect to unit source data of this period to be non-pass, in order to secure more time for rendering of corresponding unit source data. This is, for example, to make the capacity of the processor unit 240 to be used for loading be supported in the rendering capacity of the video processor unit 250. Through this, it is possible to induce the improvement of the rendering capacity of the video processor unit 250 (reduction of a rendering time).

Accordingly, in case that any one of values computed based on three determination standards illustrated in FIG. 3, that is, an activity amount of the processor unit 240, the capacity of the graphic memory 255, and the rendering time of the video processor unit 250, is more than a threshold value, the loading determination unit 230 determines the loading fitness with respect to unit source data positioned at the first loading queue to be non-pass, and moves corresponding unit source data to the second loading queue to wait, thereby cutting off loading in this period. In the meantime, the unit source data may be loaded in a period after the next period.

Referring again to FIG. 2, the processor unit 240 is a unit loading unit source data to the graphic memory 255 only in case that the loading fitness thereof is determined to be a pass by the loading determination unit 230. That is, the processor unit 240 is involved in loading of unit source data positioned at the first loading queue, and accumulates the loaded unit source data in the graphic memory 255 to wait for rendering by the video processor unit 250.

The video processor unit 250 is a unit performing rendering by using the loaded unit source data. As described above, the video processor unit 250 realizes a certain image through rendering with respect to unit source data accumulated in the graphic memory 255. In rendering by the video processor unit 250, the extraction of data from the graphic memory 255 may be performed by a variety of extraction methods, such as, a method of extracting all accumulated data at a time at a predetermined time point, for example, at a time point of rendering, or a method of independently extracting unit source data at predetermined intervals.

Accordingly, according to the present invention, there is an effect that an optimized image is realized by determining the loading availability of particular unit source data in accordance with the current capability of the processor unit 240 in charge of loading or the video processor unit 250 in charge of rendering.

Operation flows of an image resource loading system 200 according to the present invention such configured will be in detail described.

Figure 4:
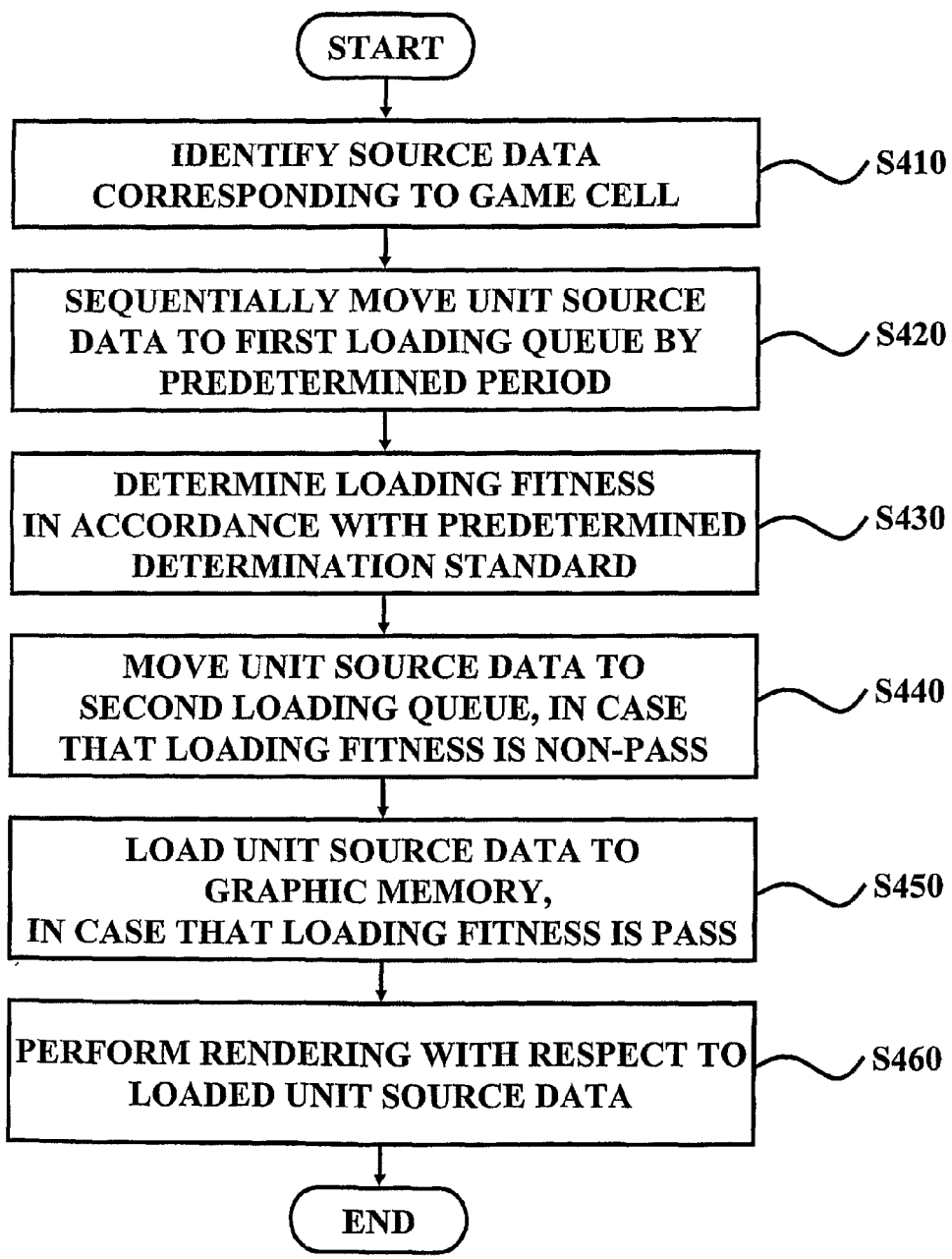
FIG. 4 is a flowchart concretely illustrating an image resource loading method according to a preferred embodiment of the present invention.

FIG. 4 is a flowchart concretely illustrating an image resource loading method according to a preferred embodiment of the present invention.

The image resource loading method of the present invention is performed by the aforementioned image resource loading system 200.

In S410, the image resource loading system 200 identifies source data associated with a particular game cell in case that a rendering event with respect to the game cell occurs. This step S410 is a procedure for recognizing source data demanded for rendering of a particular game cell from the basic recording space 210. At this time, the rendering event may occur in correspondence to change of a game cell where a player character is positioned according to a game progress, (or an estimated change). The image resource loading system 200 generates the rendering event by considering a time point when an image necessary to a corresponding gamer of the player character may be provided timely.

In step S420, the image resource loading system 200 sequentially moves unit source data constituting the identified source data to the first loading queue by a predetermined period. This step S420 is a procedure for dividing the identified source data into the predetermined size of unit source data, and moving the divided unit source data to the first loading queue by a period having a certain time interval. At this time, the divided unit source data includes sequential information associated with order to be moved to the first loading queue. The image resource loading system 200 may control unit source data including comparatively higher sequential information to be preferentially moved to the first loading queue through comparison of sequential information. The sequential information may be dynamically given whenever unit source data is loaded.

In step S430, the image resource loading system 200 determines the loading fitness of unit source data positioned at the first loading queue in accordance with a predetermined determination standard. This step S430 is a procedure for determining the loading fitness to be a pass or non-pass by considering the loading capacity of the processor unit 240 or the rendering capacity of the video processor unit 250. For example, the determination standard may be an activity amount of the processor unit 240, the size of data accumulated in the graphic memory 255, or the rendering time of the video processor unit 250, and the loading fitness determination of the image resource loading system 200 is performed based on whether a value computed in relation thereto is more than a threshold value. Accordingly, the image resource loading system 200 enables only unit source data of which the loading fitness is determined to be a pass to be restrictedly loaded. Also, the image resource loading system 200 may enable only unit source data enough to optimize image rendering with respect to a predetermined game cell to be loaded. Hereinafter, an example of determination standards and determination of non-pass of the loading fitness using the determination standards will be described with reference to FIGS. 6 to 8.

Figure 6:
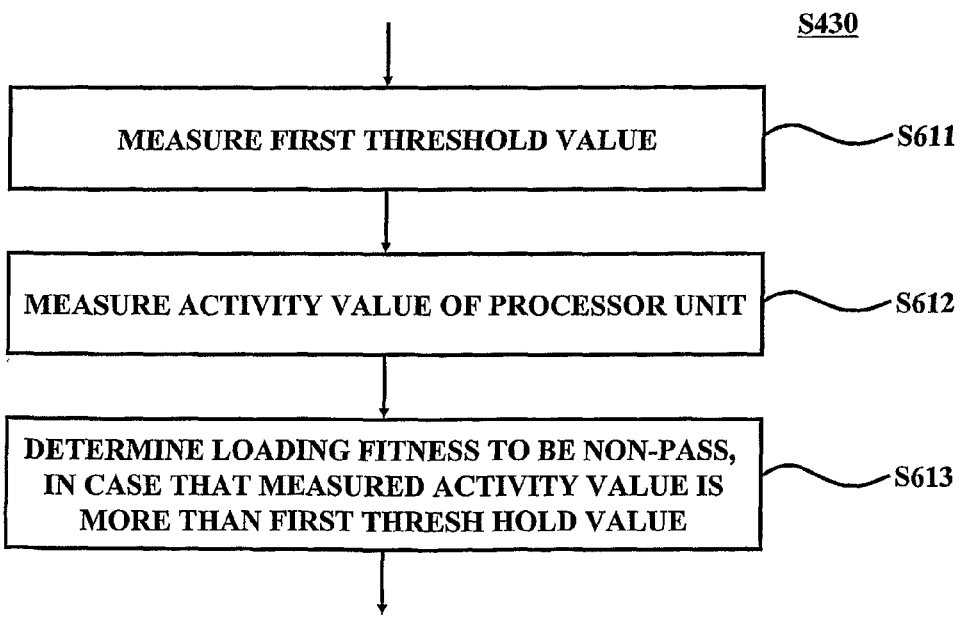
FIG. 6 is a flowchart illustrating an example of a method of determining loading fitness on the basis of an activity amount of a processor unit as a determination standard of the present invention.

FIG. 6 is a flowchart illustrating an example of a method of determining loading fitness on the basis of an activity amount of a processor unit as a determination standard of the present invention.

As illustrated in FIG. 6, in step S611, the image resource loading system 200 sets up a first threshold value on the basis of an activity value of the processor unit 240 enabling loading of unit source data positioned at the first loading queue to be completed within a predetermined period. This step S611 is a procedure for computing a standard value with respect to an activity amount of the processor unit 240 with which the functions of the processor unit 240 in charge of loading work normally. As described above, the processor unit 240 may be involved in a variety of signal processing besides loading processing. Although the processor unit 240 performs a plurality of signal processing, the image resource loading system 200 determines a maximum activity value of the processor unit 240 enabling loading of unit source data to be completed within a determined time (for one period) to be a first threshold value. In the present embodiment, it is described as an illustrative example that an activity value of the processor unit 240 enabling loading of unit source data positioned at the first loading queue to be completed within a period is determined to be a first threshold value, but according to another embodiment of the present invention, the first threshold value may be determined by a variety of methods, such as a method of determining an absolute value of an activity amount set up at random by experience or computation of a designer of this system to be a first threshold value.

Also, in step S612, the image resource loading system 200 measures an activity value of the processor unit 240. This step S612 is a procedure for detecting a current activity value of the processor unit 240 performing loading. For example, in this step S612, the image resource loading system 200 measures an activity value at a time point when unit source data is positioned at the first loading queue (a time point of determining the loading fitness).

In step S613, the image resource loading system 200 determines the loading fitness to be non-pass in case that the measured activity value is more than the setup first threshold value. This step S613 is a procedure for determining that normal loading of unit source data is impossible as an activity value of the processor unit 240 goes higher due to a plurality of signal processing. In case that the loading fitness is determined to be non-pass in this step S613, the image resource loading system 200 moves the unit source data positioned at the first loading queue to the second loading queue to wait, so that loading process of the unit source data is not performed in this period.

Accordingly, according to the present invention, there is an effect that flexible change and adjustment with respect to a loading time point is possible by determining the loading availability with respect to unit source data positioned at the first loading queue on the basis of the loading capacity of the processor unit 240.

Figure 7:
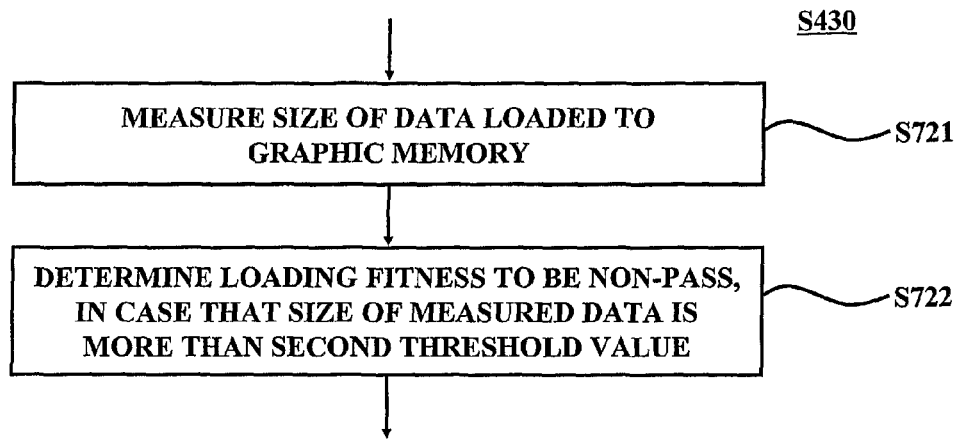
FIG. 7 is a flowchart illustrating an example of a method of determining loading fitness on the basis of the size of data to be rendered as a determination standard.

FIG. 7 is a flowchart illustrating an example of a method of determining loading fitness on the basis of the size of data to be rendered as a determination standard.

As illustrated in FIG. 7, in step S721, the image resource loading system 200 measures the size of data loaded to the graphic memory 255. This step S721 is a procedure for recognizing the size of data accumulated in the graphic memory 255 storing the loaded unit source data from the first loading queue. In the present embodiment, it is described as an illustrative example that an absolute value of the size of data accumulated in the graphic memory 255 is measured, but it is only one embodiment of the present invention. Also, the ratio of the accumulation size of accumulated data to the total capacity of the graphic memory 255 may be measured. Accordingly, a determination standard of the loading fitness may be flexibly applied at the graphic memory 255 having a variety of capacity.

Also, in step S722, the image resource loading system 200 determines the loading fitness to be non-pass in case that the size of measured data is more than a predetermined second threshold value. This step S722 is a procedure for estimating normal rendering of the video processor unit 250 to be impossible as the mass size of data to be rendered by the video processor unit 250 exists. At this time, the second threshold value may be, for example, the maximum data size enabling normal rendering by the video processor unit 250 for a predetermined time, and may be flexibly changed in accordance with the rendering capacity of the video processor unit 250. As described above, the second threshold value may be indicated as the ratio of the data size to the total capacity of the graphic memory 255. In step S722, the image resource loading system 200 moves unit source data positioned at the first loading queue to the second loading queue to wait, so that loading process of the unit source data is not performed in this period, in case that the size of measured data is more than the second threshold value.

Accordingly, according to the present invention, there is an effect that a loading time point may be flexibly changed and adjusted by determining the loading availability with respect to unit source data positioned at the first loading queue, on the basis of the size of data to be rendered, that is, the size of data accumulated in the graphic memory 255.

Figure 8:
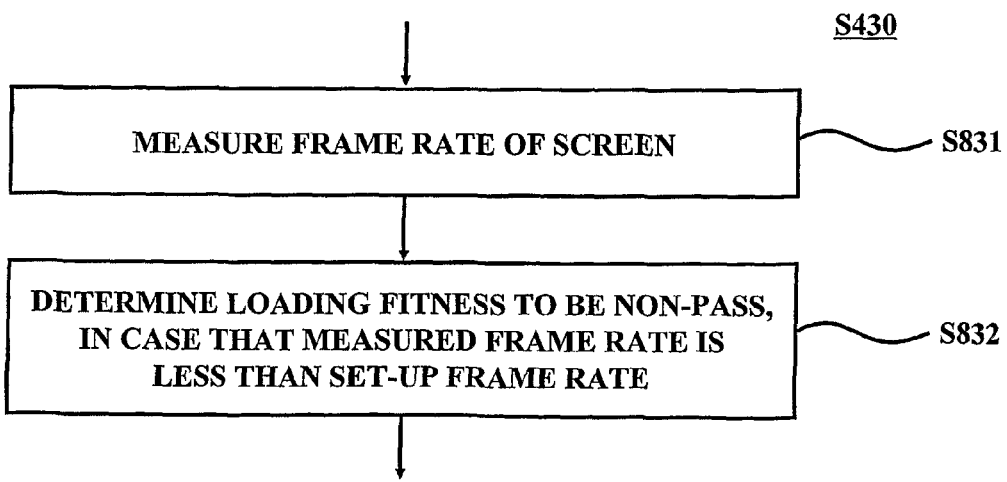
FIG. 8 is a flowchart illustrating an example of a method of determining loading fitness on the basis of a rendering time of a video processor unit as a determination standard.

FIG. 8 is a flowchart illustrating an example of a method of determining loading fitness on the basis of a rendering time of a video processor unit as a determination standard.

As illustrated in FIG. 8, in step S831, the image resource loading system 200 measures a frame rate of a screen generated as a result of the rendering. This step S831 is a procedure for identifying a frame rate of a screen (a game screen) where an image is realized in order to measure the rendering time of the video processor unit 250. That is, in this step S831, the image resource loading system 200 may measure a frame rate associated with an updating period of the rendered and generated image, and estimate a rendering time of corresponding unit source data by using the measured frame rate. For example, in case that a frame rate of a screen is high, it may be determined that each image realization speed is comparatively high, and accordingly, a time spent in rendering a certain size of unit source data becomes short. On the other hand, in case that a frame rate of a screen is low, it may be determined that unit source data to be rendered demands sophisticated and high quality of image realization, and accordingly, a rendering time becomes long.

Also, in step S832, the image resource loading system 200 determines the loading fitness to be non-pass in case that the measured frame rate is less than a set-up frame rate. This step S832 is a procedure for recognizing whether the rendering time of the video processor unit 250 is more than a set-up rendering time, for example, a third threshold value. In case that a rendering time for image realization is more than the second threshold value, that is, in case that a frame rate, an updating speed of the realized image, is measured to be less than a set-up value, the image resource loading system 200 determines that a rendering time is further needed in association with unit source data currently being rendered. Accordingly, loading of additional unit source data is not demanded, and the image resource loading system 200 moves unit source data positioned at the first loading queue to the second loading queue to wait, so that loading process of the unit source data is not performed in this period.

Accordingly, according to the present invention, there is an effect that a loading time point may be flexibly changed and adjusted by determining the loading availability with respect to unit source data positioned at the first loading queue on the basis of a numerical value of a frame rate with respect to an image realized on a screen, that is, on the basis of the rendering time of the video processor unit 250.

Also, in the step S430 of determining the loading fitness, the image resource loading system 200 determines the loading fitness to be non-pass, in case that any one of an activity value of the processor unit 240, the capacity of the graphic memory 255, and a rendering time of the video processor unit 250 is more than a predetermined set-up threshold value. That is, the loading fitness is determined to be non-pass in case that at least one of values computed based on a variety of determination standards is more than the set-up threshold value, and accordingly loading of unit source data in a corresponding period is cut off.

Accordingly, according to the present invention, there is an effect that a time point of not demanding loading of additional unit source data may be more precisely determined and image realization with respect to unit source data to be rendered is optimized.

Referring again to FIG. 4, in step S440, the image resource loading system 200 moves unit source data to the second loading queue in case that the loading fitness is determined to be non-pass. The processor unit 240 loads only unit source data positioned at the first loading queue to the graphic memory 255, and the image resource loading system 200 moves unit source data of the first loading queue to the second loading queue to wait, in order that loading by the processor unit 240 is omitted in this period. Accordingly, loading of additional unit source data that may prevent the optimized rendering is cut off for one period.

On the other hand, in step S450, the image resource loading system 200 loads the unit source data positioned at the first loading queue to the graphic memory 255 in case that the loading fitness is determined to be a pass. This step S450 is a procedure for performing a loading process by the processor unit 240 in case that at least one of an activity amount of the processor unit 240, the capacity of the graphic memory 255, and a rendering time is less than a predetermined threshold value. That is, in this step S450, the image resource loading system 200 loads unit source data positioned at the first loading queue only in case that smooth image realization by the video processor unit 250 is determined to be possible, while loading of unit source data is completed.

Also, in step S460, the image resource loading system 200 renders the unit source data loaded to the graphic memory 255. This step S460 is a procedure for realizing an image by the video processor unit 250 with respect to a game cell where a rendering event has occurred. For example, the entire data accumulated in the graphic memory 255 at a time point when rendering is completed may be selected as a rendering target.

Accordingly, according to the present invention, there is an effect that image realization is optimized by flexibly adjusting a loading time point with respect to unit source data by considering the signal processing capacity of the processor unit 240 and the video processor unit 250.

Hereinafter, it will be described as another embodiment of the present invention, moving unit source data positioned at the second loading queue with the generation of the next period to the first loading queue again.

Figure 5:
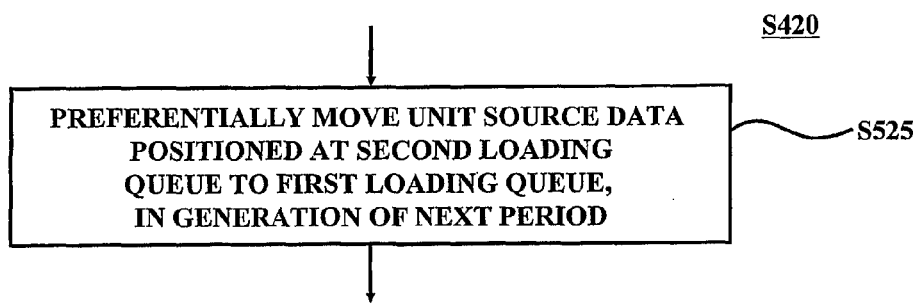
FIG. 5 is a flowchart illustrating an example of a method of preferentially moving waiting unit source data to a first loading queue.

FIG. 5 is a flowchart illustrating an example of a method of preferentially moving waiting unit source data to a first loading queue.

Movement of unit source data to the loading queue such above may be included in the step S420 of sequentially moving the unit source data to the first loading queue, and performed.

That is, in step S525, the image resource loading system 200 preferentially moves unit source data positioned at the second loading queue to the first loading queue at an arrival point of the period. This step S525 is a procedure for preferentially moving unit source data that is not loaded for the previous period to the first loading queue, irrespective of sequential information, in case that the next period occurs. After this, in accordance with a determination result with respect to the loading fitness, loading is processed or the unit source data are moved to the second loading queue to wait.

Accordingly, according to the present invention, there is an effect that consecution of image realization with respect to a rendering target is guaranteed and it is possible to prevent rendering of predetermined unit source data from being delayed by flexibly changing and adjusting the loading time point of the unit source data, but preferentially completing the loading of unit source data of which loading is cut off in this period, in the next period.

The aforementioned image resource loading system 200 of the present invention does not concretely limit the drive point of the video processor unit 250 and the processor unit 240, but, it may be preferable that the processor unit 240 and the video processor unit 250 drive the thread for loading and the thread for rendering in parallel.

Figure 9:
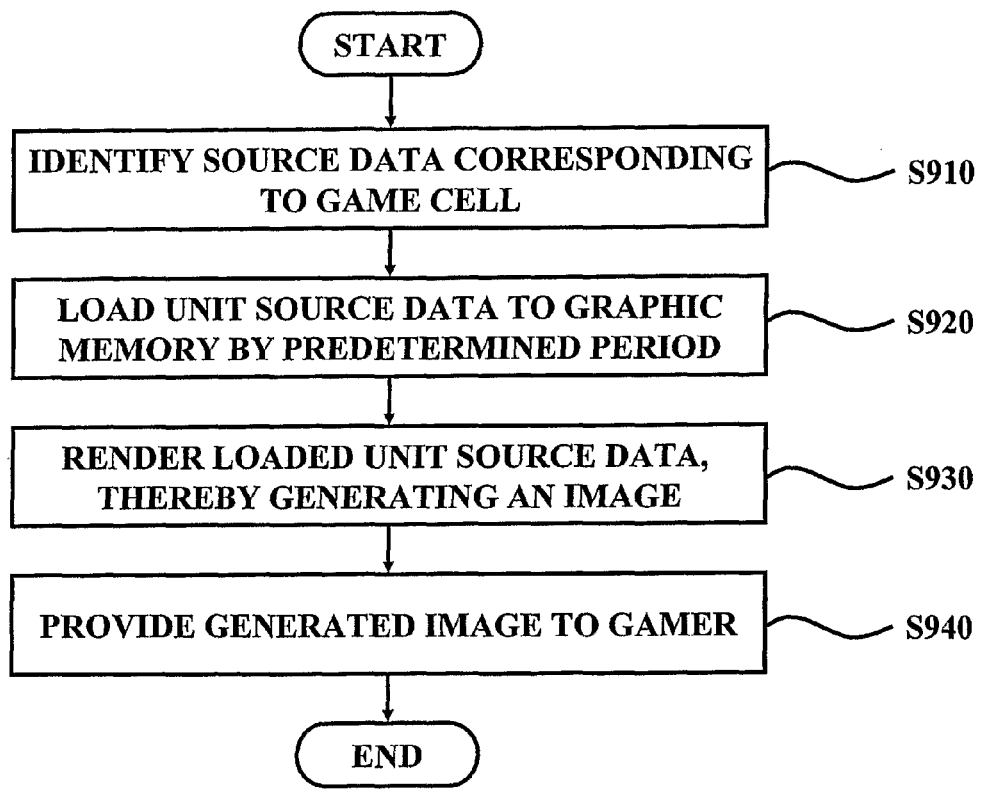
FIG. 9 is a flowchart illustrating an example of a method of both loading and rendering by driving a processor unit and a video processor unit in parallel according to the present invention.

FIG. 9 is a flowchart illustrating an example of a method of both loading and rendering by driving a processor unit and a video processor unit in parallel according to the present invention.

That is, the image resource loading system 200 adopts a method of improving the efficiency of the GPU by continuing rendering at the video processor unit 250, the GPU, while the processor unit 240, the CPU, is loading a resource. Namely, the image resource loading system 200 of the present invention is provided with the graphic memory 255, and repeats loading a resource to the graphic memory 255 and rendering the loaded resource, thereby realizing a predetermined image.

For this, in step S910, the image resource loading system 200 identifies source data associated with a particular cell from the basic recording space 210, in case that a rendering event with respect to the cell occurs. This step S910 is similar to the step S410 of recognizing source data demanded for rendering of a particular game cell from the basic recording space 210.

Also, in step S920, the image resource loading system 200 sequentially load unit source data constituting the identified source data to the graphic memory 255 per predetermined period. This step S920 is a procedure for loading unit source data divided into a predetermined size to the processor unit 240 per period having a certain time interval.

In step S930, the image resource loading system 200 renders the unit source data loaded to the graphic memory 255, thereby generating an image. This step S930 is a procedure for performing rendering of unit source data by the video processor unit 250. In this step S930, the image resource loading system 200 performs rendering with respect to unit source data accumulated in the graphic memory 255 at a time point when a predetermined rendering event occurs.

Also, in step S940, the image resource loading system 200 displays the generated image on a predetermined display unit. This step S940 is a procedure for realizing an image and proving the realized image to the gamer 120.

Particularly, in this step S940, the image resource loading system 200 performs the loading by the processor unit (S920) and the rendering by the video processor unit 250 (S930) in parallel. That is, there is an effect that it is possible to reduce a lag phenomenon which occurred in the conventional resource loading method, by performing both loading and rendering together, thereby controlling the time difference between the loading and the rendering.

Particularly, the image resource loading system 200 may enable loading and rendering to be performed to the optimization by flexibly changing and adjusting the use of system resources for loading or rendering, such as, the processor unit 240, or the video processor unit 250.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 10:
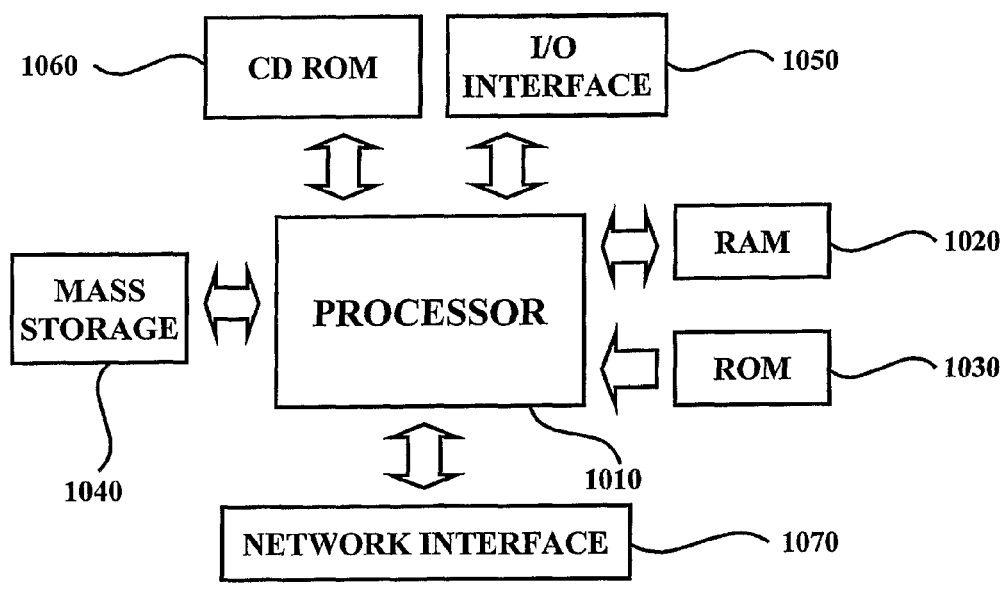
FIG. 10 is an internal block diagram of a general-purpose computer which may be employed in implementing the image resource loading method according to the present invention.

FIG. 10 is an internal block diagram of a general-purpose computer which may be employed in implementing the image resource loading method according to the present invention.

A computer apparatus 1000 includes at least one processor 1010 connected to a main memory device including a RAM (Random Access Memory) 1020 and a ROM (Read Only Memory) 1030. The processor 1010 is also called as a central processing unit CPU. As well-known to the field of the art, the ROM 1030 unidirectionally transmits data and instructions to the CPU, and the RAM 1020 is generally used for bidirectionally transmitting data and instructions. The RAM 1020 and the ROM 1030 may include a certain proper form of a computer readable recording medium. A mass storage device 1040 is bidirectionally connected to the processor 1010 to provide additional data storage capacity and may be one of the computer readable recording medium. The mass storage device 1040 is used for storing programs and data and is an auxiliary memory. A particular mass storage device such as a CD ROM 1060 may be used. The processor 1010 is connected to at least one input/output interface 1050 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 1010 may be connected to a wired or wireless communication network via a network interface 1070. The procedure of the described method can be performed via the network connection. The described devices and tools are well-known to those skilled in the art of computer hardware and software.

The described hardware devices may be formed to be operated by at least one software module in order to perform the operations of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

As used in this application, the term "unit" is intended to refer to but is not limited to, a software or hardware component, which performs certain tasks. A unit or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

According to the present invention, there are provided image resource loading method and system, which enable a loading process loading an image resource and a rendering process rendering the loaded image resource to be performed in parallel by a separate thread, and can dynamically allocate each system resource necessary for the loading process or the rendering process to the optimization. Thus, according to the present invention, there are provided image resource loading method and system which can provide the most natural screen to a user by reducing a lag phenomenon in generating an image by the rendering process, that is, which can maintain a frame rate to be within the maximum range of error.

Also, according to the present invention, there are provided image resource loading method and system, which can flexibly adjust a loading time point of unit source data by determining the loading availability with respect to particular unit source data in accordance with the capacity of a processor unit, a CPU, or a video processor unit, a GPU.

Also, according to the present invention, there are provided image resource loading method and system, which guarantee the optimization of image realization with respect to unit source data to be rendered by precisely determining a time point when a loading process with respect to unit source data is improper on the basis of determination of loading fitness, and cut off the loading process in a corresponding period.

Also, according to the present invention, there are provided image resource loading method and system, which guarantee the consecution of image realization with respect to a rendering target by enabling a loading process with respect to unit source data of which loading process is cut off in a previous period to be preferentially performed in the next period, while flexibly adjusting and changing a loading time point of unit source data.

The invention claimed is:

1. A method for loading an image resource, the method comprising:
   identifying source data associated with a particular cell from a basic recording space if a rendering event for the cell occurs, the basic recording space recording a position of an object associated with at least one cell, the identified source data comprising unit source data;
   sequentially moving the unit source data to a first loading queue according to a determined period;
   determining whether the unit source data positioned at the first loading queue can be loaded in accordance with a determination standard, the determination standard associated with loading capacity of a first processor unit and a rendering capacity of a video processor unit, the loading capacity of the first processor unit associated with an activity value of the first processor unit, and the rendering capacity of the video processor unit associated with a rendering time of the video processor unit;
   moving the unit source data to a second loading queue if the unit source data positioned at the first loading queue cannot be loaded;
   loading the unit source data positioned at the first loading queue to a graphic memory if the unit source data positioned at the first loading queue can be loaded; and
   rendering the unit source data loaded to the graphic memory,
   wherein the step of determining comprises determining loading fitness of the unit source data to be a pass or non-pass if the activity value of the first processor unit and the rendering time of the video processor unit are more than respective dtermined threshold values.

2. The method of claim 1, wherein the step of loading the unit source data to the graphic memory and the step of rendering the unit source data are performed in parallel.

3. The method of claim 1, wherein the step of determining whether the unit source data positioned at the first loading queue can be loaded comprises:
   setting up the determined threshold value according to the activity value of the first processor unit enabling unit source data positioned at the first loading queue to be loaded at the graphic memory for the determined period;
   measuring the activity value of the first processor unit; and
   determining the unit source data positioned at the first loading queue not to be loaded if the measured activity value is more than the threshold value.

4. The method of claim 1, wherein the step of determining whether the unit source data positioned at the first loading queue can be loaded comprises:
   measuring a size of data loaded to the graphic memory; and
   determining the unit source data positioned at the first loading queue not to be loaded if the size of measured data is more than the threshold value;
   wherein the threshold value is determined in accordance with the capacity of the graphic memory.

5. The method of claim 1, further comprising:
   measuring the rendering time of a screen generated as a result of the rendering; and
   determining the unit source data positioned at the first loading queue not to be loaded if the measured rendering time is less than a determined frame rate.

6. The method of claim 1, further comprising preferentially moving the unit source data positioned at the second loading queue to the first loading queue at an arrival point of the determined period.

7. A non-transitory computer-readable storage media having program instructions that, when executed, perform the method according to claim 1.

8. The method of claim 1, further comprising:
   identifying, by the basic recording space, the cell requiring rendering; and
   determining the source data corresponding to the identified cell.

9. The method of claim 1, wherein the step of determining further comprises determining loading fitness of the unit source data to be a pass or non-pass, further based on a capacity of the graphic memory, and
   wherein the source data is divided into determined unit sizes to optimize loading of the source data, the source data being divided based on source data type.

10. An image resource loading system, comprising:
    a basic recording space to store source data of a cell;

a source identification unit to identify a cell associated with an event if the event occurs, the source identification unit identifying source data corresponding to the cell associated with the basic recording space, and transmitting sequential information to a unit source data comprising the identified source data in accordance with a determined standard;

a loading determination unit to move the unit source data to a first loading queue according to the sequential information and a set period, the loading determination unit determining loading fitness of the moved unit source data to be a pass or non-pass, the loading determination unit moving unit source data having non-pass loading fitness to a second loading queue;

a processor unit to load unit source data having pass loading fitness to a graphic memory; and a video processor unit to render images based on the loaded unit source data, wherein the loading determination unit determines loading fitness of the unit source data to be a pass or non-pass in accordance with a determination standard, the determination standard associated with a loading capacity of the processor unit and a rendering capacity of the video processor unit, the loading capacity of the processor unit associated with an activity value of the processor unit, and the rendering capacity of the video processor unit associated with a rendering time of the video processor unit.

11. The system of claim 10, wherein the loading determination unit determines that the loading fitness is non-pass if the activity value of the processor unit is more than the determined threshold value.

12. The system of claim 10, wherein the loading determination unit determines that the loading fitness is non-pass if a size of data accumulated in the graphic memory is more than the determined threshold value.

13. The system of claim 10, wherein the loading determination unit determines that the loading fitness is non-pass if the rendering time of the video processor unit is more than the determined threshold value.

14. The system of claim 10, wherein the basic recording space identifies the cell requiring rendering and determines the source data corresponding to the identified cell.

15. The system of claim 10, wherein the loading determination unit determines loading fitness of the unit source data to be a pass or non-pass, further based on a capacity of the graphic memory, and wherein the source identification unit divides the source data into determined unit sizes to optimize loading of the source data, the source data being divided into different sizes based on source data types comprising object data and model data.

16. An image resource loading system, comprising:

a basic recording space to store source data of a cell;

a source identification unit to identify a cell associated with an event if the event occurs, the source identification unit identifying source data corresponding to the cell associated with the basic recording space, and transmitting sequential information to a unit source data comprising the identified source data in accordance with a determined standard;

a loading determination unit to move the unit source data to a first loading queue according to the sequential information and a set period, the loading determination unit determining loading fitness of the moved unit source data to be a pass or non-pass, the loading determination unit moving unit source data having non-pass loading fitness to a second loading queue;

a processor unit to load unit source data having pass loading fitness to a graphic memory; and a video processor unit to render images based on the loaded unit source data, wherein the loading determination unit determines loading fitness of the unit source data to be a pass or non-pass in accordance with a determination standard, the determination standard associated with a loading capacity of the processor unit and a rendering capacity of the video processor unit, the loading capacity of the processor unit associated with an activity value of the processor unit, and the rendering capacity of the video processor unit associated with a rendering time of the video processor unit, and wherein the basic recording space identifies the cell requiring rendering and classifies the source data according to the identified cell.

17. The system of claim 16, wherein the loading determination unit determines loading fitness of the unit source data to be a pass or non-pass, further based on a capacity of the graphic memory, and wherein the source identification unit divides the source data into determined unit sizes to optimize loading of the source data, the source data being divided based on source data type.

* * * * *